Patented June 19, 1951

2,557,078

UNITED STATES PATENT OFFICE 2,557,078

ENZYME PRODUCTION

Julian Corman, Peoria, Ill., assignor to United States of America as represented by the Secretary of Agriculture No Drawing. Application December 12, 1947, Serial No. 791,443

10 Claims. (Cl. 195—66)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the production of fungal enzymes and more particularly to a process whereby an amylolytic enzyme preparation, having high maltase activity and capable of converting amylaceous matter to non-bitter sugar products, is obtained.

An object of this invention is to provide a fungal enzyme preparation with high amyloyltic activity which may be utilized in the saccharification of starch material to produce high-quality sugar products free from bitter taste or odor and with improved color characteristics.

Another object of this invention is the utilization of these novel enzyme preparations to prepare sugar products by the direct enzymatic conversion of starch material.

Still another object is the utilization of the enzyme preparation as an integral part of the process of preparing farinaceous mashes of high fermentability for use in the production of high quality alcohol and the like.

Other objects will be apparent from the description of the invention.

In the past it has been suggested to utilize enzymes in the production of sugars from starch materials. Application of the enzymes has usually been in the later stage of a dual type of starch conversion in which acid hydrolysis comprises the initial stage.

There are a number of enzyme preparations which have been suggested for this purpose, and fungal enzymes have proven to be of considerable value. They have inherent advantages. For example, the saccharifying effect brings about an increase in the sugar yield, since they utilize partial conversion products of the acid hydrolysis. These fungal enzymes have been prepared by inoculating a protein-containing substance, such as wet sterile bran with fungus spores and allowing growth to proceed for a number of days. The enzyme is obtained by extraction with water and precipitation by means of alcohol.

Despite its inherent advantages, the efficacy of fungal enzymes in the saccharification of starch material has been seriously limited by attendant disadvantages. During the preparation of the enzymes many deleterious soluble substances, such as protein degradation products, are present in the enzyme preparation. These impurities tend to impart bitter tastes to the sugar product unless the mount of enzyme used is kept below an inconvenient level. Furthermore, proteins themselves are introduced which impart undesirable taste qualities to the sugar product. Furthermore, the fungal enzymes of the prior art have an undesirable tendency to vary in composition and activity and to produce cloudy syrups.

I have found that fungal enzymes can be produced from raw material containing assimilable nitrogen sources, each of which has an unvarying composition and none of which introduces deleterious solubles or protein materials. I employ inorganic or organic nitrogen sources which are distinct chemical compounds. When a synthetic medium is prepared and used with these nitrogen sources as components, an enzyme product is obtained which has high maltase activity. While the constitution of the enzyme of this invention is not definitely known, it may be described as an amylolytic enzyme of high maltase activity.

In my process I use a medium in which all the constitutents are of known composition. Such a medium is hereafter termed a synthetic medium. I have discovered that the use of inorganic nitrogen sources such as ammonium sulfate, ammonium nitrate, alkali metal nitrates and nitrites, as well as organic nitrogen sources such as urea, aspartic acid, and asparagine, have resulted in good enzyme production. These nitrogen sources may be used singly with good results. I prefer however to use them in combination; for example, the combination of ammonium nitrate and sodium nitrite give especially good results. Any assimilable protein-free nitrogen source, that is, free from proteins themselves or degraded proteins, may be used. These nitrogen sources are raw materials which are readily accessible to everyone and the use of each results in the preparation of a product which contains a minimum of extraneous matter and which is capable of being reproduced at will. According to my invention, therefore, an enzyme preparation having a specified charracteristic of alpha amylase and high maltase activity is provided.

In the "amylo" process for alcohol production, fungal enzymes have been utilized which were produced by aerobic cultivation of fungi in proteinaceous and carbohydrate-containing mashes. They have also been produced in substrates of variable protein and carbohydrate concentrations and then added to grain mashes for saccharification. As pointed out above, the enzyme preparations so produced have the disadvantages of deleterious soluble materials and varying enzyme activity.

In practicing the invention the following procedure is followed: An amylolytic enzyme-producing fungus is grown in a medium comprising an assimilable inorganic and/or particular organic compound containing an assimilable protein-free nitrogen source along with an assimilable carbon source material, such as a carbohydrate. The culture medium is maintained between a pH of about from 4.0 to 9.0 during the cultivation period, and the growth of the organism is effected throughout the entire body of the medium by aeration and/or agitation. The period of cultivation usually takes several days. The medium is filtered and the enzyme may be recovered as by evaporation or by using the filtrate directly in the saccharification of starch material.

In general the fermentation procedure in preparing the enzymes is initiated at a pH of about 6. As the fermentation proceeds, the hydrogen ion concentration varies. In those cases where the anion contains the assimilable nitrogen, for example sodium nitrite or sodium nitrate, the pH increases due to release of the cation. In those cases where the assimilable nitrogen is in the cation, for example ammonium sulfate, the pH decreases due to liberation of the anion. The pH may be maintained within the critical range by employing buffering substances. We may use phosphates for this purpose, for example alkali metal mono- and di-hydrogen phosphates. Calcium carbonate may also be used.

In order to satisfy the inorganic requirements for growth and proper metabolic function of the microorganism, the usual trace elements, such as magnesium, sulfur, phosphorous, iron, zinc, sodium, potassium, and manganese are supplied in minor proportions to the medium.

The particular carbohydrate used is not critical and may be, for example, starch, dextrins, maltose, glucose, soluble starch, xylose, inulin, sucrose, and the like.

It is interesting to note that in the process of this invention no addition of growth factors is required. These factors are of complex character and are found in limited amounts in natural products, such as bran, corn steep liquor, distillers' thin stillage, and the like. In the past fungi have been grown on synthetic media, but no successful attempts to produce amylolytic enzymes in such manner have been reported.

I have discovered that the above-described conditions of hydrogen ion concentration and aeration and/or agitation are necessary for the satisfactory production of the enzyme compositions of this invention.

The enzyme compositions of this invention are useful in converting farinaceous material to sugars, and they may be used generally for this purpose. A particular advantage, since the character of the enzyme can be controlled and its activity predicted, lies in the fact that they may be used with other enzymes, such as those derived from plant or animal origin. The activity of my enzymes may be used to advantage in combination with other enzymes to supplement the activity and convert the starch material more efficiently and economically.

The folowing specific examples illustrate the invention:

EXAMPLE 1

A synthetic medium containing the following ingredients was prepared as follows:

| | | |
|---|---|---|
| $NaNO_3$ | g | 2.47 |
| $KH_2PO_4$ | g | 1 |
| $MgSO_4$ | g | 1 |
| $FeSO_4$ | mg | 2 |
| $MnSO_4$ | mg | 2 |
| $ZnSO_4$ | mg | 2 |
| Distilled water | l | 1 |

Two hundred ml. of this medium was autoclaved at 15 pounds steam pressure for 30 minutes in a 500 ml. Erlenmeyer flask that contained 3 grams of starch. After cooling to 30° C., 1 g. of sterile calcium carbonate was added and the mixture was inoculated with a culture of *Aspergillus niger*, NRRL 337. The flask was then placed on a reciprocating platform shaker for 7 days, after which the culture was filtered.

The filtrate assayed 790 alpha amylase units per ml. when determined by the method described by Olson, Evans, and Dickson in Cereal Chemistry, November, 1944, page 533. One part of the culture filtrate was incubated with 2 parts of 1.05 percent maltose monohydrate solution for 2 hours at 30° C. and pH 4.6. It converted 50 percent of the maltose monohydrate to glucose and was arbitrarily assigned a value of 50 maltase units.

When 5 ml. of the same culture filtrate was incubated with 50 ml. of 2 percent soluble starch solution for 24 hours, the resultant hydrolysate contained 1.14 g. of glucose and 0.14 g. of maltose per hundred ml. of solution.

*Aspergillus niger*, NRRL 337, was used as the organism for inoculation of a plurality of media, containing 500 mg. of nitrogen per liter, of various other nitrogen sources in a manner similar to the above example. The following results shown in tabulated form were obtained:

Table I

| Nitrogen compound used | Alpha amylase units | Maltase units |
|---|---|---|
| Aspartic acid | 322 | 21.7 |
| Urea | 481 | 11.8 |
| Asparagine | 344 | 26.2 |
| Sodium nitrate | 630 | 22.7 |
| Ammonium sulphate | 168 | 6.8 |

A plurality of other species of Aspergillus was employed in a manner similar to Example 1, using sodium nitrite as the nitrogen source. The filtrates assayed as follows:

Table II

| Species of Fungus | Alpha amylase units | Maltase units |
|---|---|---|
| *A. oryzae* NRRL 458 | 903 | 8.7 |
| *A. oryzae* NRRL 464 | 270 | 35.9 |
| *A. oryzae* NRRL 694 | 737 | 40.1 |
| *A. oryzae* NRRL 696 | 737 | 44.1 |
| *A. oryzae* NRRL 697 | 1,232 | 3.2 |
| *A. phoenicis* NRRL 363 | 332 | 42.9 |
| *A. niger* NRRL 326 | 126 | 15.9 |
| *A. oryzae* NRRL 695 | 1,440 | 16.0 |

EXAMPLE 2

Into a fermentation vessel of 4 l. capacity a mixture of the following composition was autoclaved:

| | |
|---|---:|
| Soluble starch _____ g__ | 45.00 |
| NaCl _____ g__ | 3.00 |
| MgSO$_4$ _____ g__ | 3.00 |
| NaNO$_2$ _____ g__ | 4.44 |
| NH$_4$NO$_3$ _____ g__ | 1.71 |
| K$_2$HPO$_4$ _____ g__ | 26.13 |
| KH$_2$PO$_4$ _____ g__ | 20.41 |
| FeSO$_4$ _____ g__ | .006 |
| ZnSO$_4$ _____ g__ | .006 |
| MnSO$_4$ _____ g__ | .006 |
| Distilled water _____ liters__ | 3 |

After cooling, the medium was inoculated with a pure culture of *Aspergillus oryzae* NRRL 458. The fermentation vessel was equipped with an air sparger and stirrer. The medium was aerated at a rate of one volume of air per volume of medium per minute. After 72 hours fermentation the mycelium was filtered. The culture filtrate assayed 2520 alpha amylase units and 46.8 maltase units per ml.

The following example illustrates the use of the fungal enzymes of this invention for the production of farinaceous mashes of high fermentability (as exemplified by high yields of ethanol obtained when the saccharified mashes were fermented with a distillers yeast):

EXAMPLE 3

Fifty g. of ground corn was weighed in a 500 ml. Erlenmeyer flask containing 200 ml. of tap water. The mixture was steamed at atmospheric pressure for 10 minutes and then well stirred. The flask was then autoclaved at 25 pounds steam pressure for 30 minutes and then allowed to cool to 72° C. To this was added 50 ml. of fungal culture filtrate with stirring, and the flask was kept at 55° for 30 minutes. The mash was then cooled to 30° C. and 10 ml. of a 24-hour culture of *Saccharomyces cerevisiae*, NRRL Y567, was added and the mixture allowed to ferment for 89 hours. After distillation, the alcohol was determined by a refractometer and the yield per bushel of corn calculated. The above procedure was followed with various Aspergilli cultures and in each case the alcohol produced was of high quality and free from any deleterious odor or taste. The alcohol yield per bushel of corn (10 percent moisture) was as follows:

*Table III*

| Species of Mold | Source of nitrogen in culture medium | Proof gallons Alcohol per bushel |
|---|---|---|
| A. oryzae NRRL 695 | Urea | 5.20 |
| A. oryzae NRRL 695 | NaNO$_3$ | 5.45 |
| A. oryzae NRRL 696 | ___do___ | 5.67 |
| A. oryzae NRRL 458 | ___do___ | 5.57 |
| A. alleacious NRRL 315 | ___do___ | 5.35 |
| A. flavius oryzae NRRL 449 | ___do___ | 5.13 |
| A. oryzae NRRL 694 | Urea | 5.48 |

For purposes of comparison, mash saccharified with 10 percent malt, in accordance with conventional practice, gave a yield of 5.1 proof gallons of alcohol per bushel when fermented under conditions similar to those of Example 3. The results shown in Example 3 and Table III illustrate the high starch saccharifying efficiency of these enzyme preparations and illustrate their ability to convert farinaceous materials to sugars of high fermentability. There is only a small amount of unfermentable dextrins in mashes saccharified by the compositions of this invention, and this fact is illustrated by the increased alcohol yields compared with the mash saccharified with malt.

The fungus cultures employed in the above examples were species of the genus Aspergillus designated in the stock culture collection of the United States Department of Agriculture, Northern Regional Research Laboratory (NRRL), by the number following the species listed.

Having thus described my invention, I claim:

1. A process comprising cultivating an amylolytic enzyme-producing fungus in a sterile synthetic medium containing an assimilable protein-free nitrogen source and an assimilable carbon source material at a pH of about from 4.0 to 9.0 under conditions favorable for the growth of the fungus until appreciable quantities of an enzyme having amylolytic properties and possessing high maltase activity are produced, and then recovering the enzyme.

2. The process of claim 1 wherein the fungus is a species of the genus Aspergillus.

3. The process of claim 1 wherein the fungus is of the species *Aspergillus oryzae*.

4. The process of claim 1 wherein the nitrogen source material is sodium nitrite.

5. The process of claim 1 wherein the nitrogen source material is sodium nitrate.

6. The process of claim 1 wherein the nitrogen source material is a mixture of ammonium nitrate and sodium nitrite.

7. The process of claim 1 wherein the nitrogen source material is aspartic acid.

8. The process of claim 1 wherein the nitrogen source material is urea.

9. The process of claim 1 wherein the nitrogen source material is asparagine.

10. The process of claim 1 wherein the carbon source material is a carbohydrate.

JULIAN CORMAN.

REFERENCES CITED

The following references are of record in the file of this patent:

UNITED STATES PATENTS

| Number | Name | Date |
|---|---|---|
| 411,231 | Takamine | Sept. 17, 1889 |
| 1,599,930 | Takamine | Sept. 14, 1926 |
| 1,611,700 | Waksman | Dec. 21, 1926 |
| 2,291,009 | Underkoffler | July 28, 1942 |
| 2,356,218 | Christensen | Aug. 22, 1944 |

FOREIGN PATENTS

| Number | Country | Date |
|---|---|---|
| 156,635 | Great Britain | of 1921 |
| 186,633 | Great Britain | of 1922 |

OTHER REFERENCES

Smith, Industrial Mycology, Edw. Arnold & Co. Ltd., 2nd ed., 1942, pages 166, 171, 172, 173.

Thom and Raper, Manual of the Aspergilli (1945), Williams and Wilkins Co., Baltimore, pages 31 to 38, 270.